United States Patent
Yao

(10) Patent No.: US 7,349,076 B2
(45) Date of Patent: Mar. 25, 2008

(54) VIDEO TRACKING-BASED REAL-TIME HYPERSPECTRAL DATA ACQUISITION

(75) Inventor: Haibo Yao, Slidell, LA (US)

(73) Assignee: The Institute for Technology Development MI (US)

( * ) Notice: Subject to any disclaimer, the term of this patent is extended or adjusted under 35 U.S.C. 154(b) by 328 days.

(21) Appl. No.: 11/034,956

(22) Filed: Jan. 14, 2005

(65) Prior Publication Data
US 2006/0158647 A1    Jul. 20, 2006

(51) Int. Cl.
*G01N 21/00* (2006.01)
*G01J 3/26* (2006.01)

(52) U.S. Cl. .......................... 356/72; 356/326
(58) Field of Classification Search ................ 356/326, 356/328, 300, 419, 72
See application file for complete search history.

(56) References Cited

U.S. PATENT DOCUMENTS

| | | | |
|---|---|---|---|
| 5,608,520 A | 3/1997 | Fleming | |
| 5,790,188 A | 8/1998 | Sun | |
| 6,211,906 B1 | 4/2001 | Sun | |
| 6,495,818 B1 | 12/2002 | Mao | |
| 6,529,769 B2 | 3/2003 | Zigler | |
| 6,667,761 B1 | 12/2003 | Ludwig et al. | |
| 2003/0123056 A1* | 7/2003 | Barnes et al. | 356/300 |

OTHER PUBLICATIONS

Tseng, Yi-Hsing. 1999 Spectral Mixture Analysis of Hyperspectral Data. Asia conference on Remote sensing ACRS1999 Technical Session 10.
Yao, Haibo, Tian, L, Tang, L., Thorp, K. 2002. Corn canopy reflectance study with a real-time high density spectral-image mapping system. ASAE meeting paper No. 023144. St. Joseph, MI: ASAE.
Yao, Haibo. 2004. Hyperspectral Imagery for Precision Agriculture. Ph.D. Dissertation. Chapter 8. Department of Agricultural and Biological Engineering. University of Illinois at Urbana Champaign.

* cited by examiner

*Primary Examiner*—F L Evans
*Assistant Examiner*—Abdullahi Nur
(74) *Attorney, Agent, or Firm*—Crowell & Moring LLP

(57) ABSTRACT

A spectroscopy system for high-accuracy, highly automated spectral imaging of a target is provided. Video and spectrometry information are obtained via an integrated video, spectrometry and distance sensing platform and processed by a computer. The processed video and spectrometry information are presented in real-time on an integrated display, with a graphical representation of the actual ground instantaneous field of view of the spectrometer sensor overlaid directly onto the video image of the target to provide real-time target aiming information, thus enabling the operator to rapidly optimize spectral data acquisition.

18 Claims, 2 Drawing Sheets

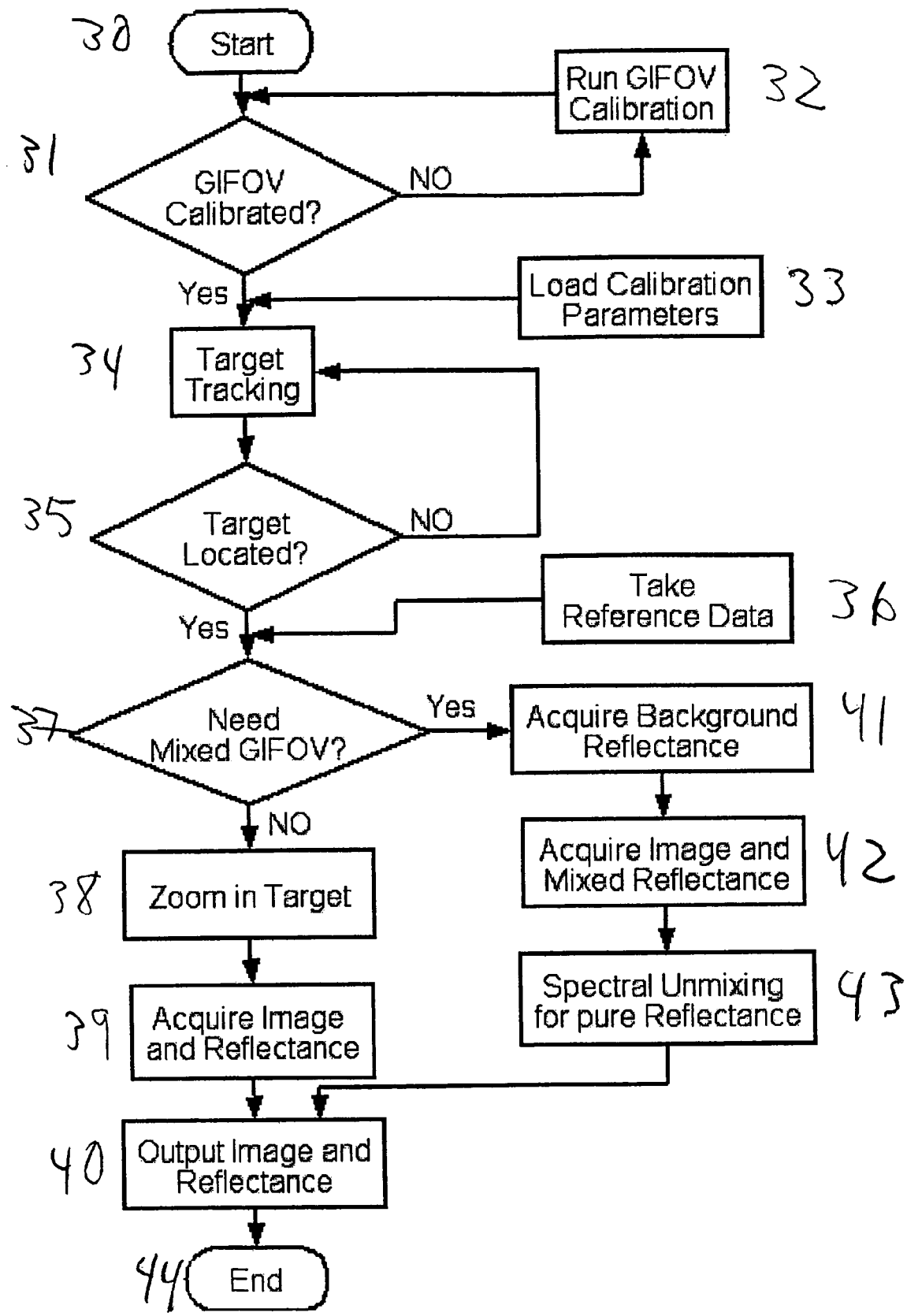

VIDEO TRACKING-BASED REAL-TIME HYPERSPECTRAL DATA ACQUISITION

BACKGROUND AND SUMMARY OF THE INVENTION

The present invention relates to the field of high resolution hyperspectral imaging.

Hyperspectral imaging systems in general are known, and have been used for a diverse range of remote sensing and other analytical techniques, such as is disclosed, for example, in U.S. Pat. No. 5,790,188 and the related U.S. Pat. No. 6,211,906. Hyperspectral imaging has also been used in conjunction with microscopic optical systems, such as disclosed, for example, in U.S. Pat. No. 6,495,818. In such systems, radiation reflected by or emanating from a target or specimen is detected in a large number of narrow contiguous spectral bands, producing a data set which is distributed not only spatially, but spectrally as well. That is, for each pixel within an image of the target, information is recorded in each of the spectral bands, thereby producing a three-dimensional hyperspectral image cube, in which spectral information for each pixel is distributed across a spectral axis perpendicular to the spatial axes.

Previously, hyperspectral imaging has been hampered by difficulties in accurately aiming, imaging, processing and displaying data in real-time. One such problem in particular is that previously known hyperspectral imaging systems lack the ability to quickly and accurately adapt their imaging devices to the size and relative position of the imaging target, and to process and present spectral information in a timely manner to provide real-time user review and refinement of image acquisition.

For example, U.S. Pat. No. 5,608,520 describes an apparatus for application of laser light to a target such as a tumor, where light reflected from the laser is monitored by a spectrometer over a fiber optic line. A separate video camera provides an image of the tumor to permit visual monitoring of the procedure. The imaging devices are operated completely independently of one another. That is, there is no provision for coordinated processing of both the video and spectrometer image data to provide real-time, integrated display of the video and spectral information.

Another example is found in U.S. Pat. No. 6,529,769 B2, in which an endoscope is coupled to a spectrometer and a video camera (a "CCD" camera employing a charge-coupled device for its imaging sensor). Images from each are separately displayed side-by-side on a display unit. There is no provision for adjustment of the endoscope's imaging elements (e.g., the fiber optic elements at the probe-end of the endoscope) to align the images received by the video camera and by the spectrometer relative to one another, nor any provision for processing to identify and optimize the imaging of a target area.

Similarly, U.S. Pat. No. 6,667,761 discloses an "instrument visualization system," in which a video camera and a sensor, such as a pyrometer, are pre-aligned on a sensor platform, so that the sensor's detection element is aligned with a spot within the video camera's field of view that is represented by a targeting artifact on a video display. This system has no provision for altering the spatial relationship between the sensor and the target (such as by moving closer or farther away from the target), or any means for processing the spectral information obtained across the entire field of view of the spectrometer to extract desired spectral reflectance information. The latter concern is an important factor in optimizing spectral imaging performance, where the target image information might be substantially diluted if a large fraction of background area is in the sensor's field of view.

Thus, there is a need for an improved system and method for real-time, simultaneous image data acquisition, processing and display from non-visual and visual imaging devices, including obtaining improved sensor performance from enhanced real-time sensor positioning, such as by better matching the sensor's field of view to the size of a target.

The present invention addresses the foregoing problems by providing an integrated system for spectral imaging of a target. The system includes a spectrometer imaging device (such as a fiber optic camera lens communicating with a spectrometer), a video imaging device (such as a CCD camera), and a distance sensor, all mounted in an integrated sensor probe. The video imaging device and the spectrometer imaging device are arranged on the integrated sensor probe such that their respective fields of view at least partially overlap. The integrated sensor probe communicates with a computer which processes the image data received from the imaging devices and the distance sensor.

The computer displays on a display unit an image obtained from the video imaging device. Overlaid on the video image is a computer-generated graphic symbol representing the shape and location of the spectrometer imaging device's "ground instantaneous field of view" to provide an operator with a real-time indication as to which portion of the video camera's field of view is being imaged by the spectrometer. The ground instantaneous field of view ("GIFOV") is the extent of the two-dimensional area within view of the device at a given distance from the spectrometer imaging device. For example, a spectrometer imaging device with a 30 degree-wide cone-shaped field of view, located 100 cm from a target, will have a GIFOV in the shape of a circle with a radius of 25.88 cm.

In the present invention, the GIFOV of the spectrometer imaging device at any particular instant is determined, in real-time, by the computer. The computer determines the GIFOV from the instantaneous distance of the spectrometer imaging device to a target sensed by the distance sensor, coupled with a predetermined actual field of view profile. The actual shape of the spectrometer imaging device's field of view is predetermined and stored in a profile to improve imaging accuracy, recognizing that the imaging device's filed of view may not be precisely conical.

In addition to display of the video image and the overlaid spectrometer GIFOV, the computer may also be programmed to display (in an adjacent area of the display screen, for example), a real-time representation of data obtained from the GIFOV spectrometer. An operator would thereby be provided with real-time information regarding the spectral emissions from the target, while simultaneously being able to visually correlate the spectral information with the specific target area being imaged by the spectrometer.

It is a further objective of the present invention to enhance the accuracy and speed of image data collection and processing by automating various aspects of imaging target acquisition and optimization. A computer-assisted calibration procedure may be used with the present invention to provide an initial definition of the actual extent of the field of view of the spectrometer imaging device. In this procedure, the computer displays a "virtual grid" pattern of known dimensions (for example, a 100×100 grid) on the display while the video imaging device and the spectrometer imaging device are viewing a simple target, such as a black target background. A spectrally-contrasting object, such as a small white target, is sequentially moved across each of the cells in the virtual grid, and the response of the spectrometer obtained at each cell position. This procedure will allow rapid identification of the actual limits of the field of view of the spectrometer imaging device. Further, by knowing both the distance from the imaging device to the target background and the actual two-dimensional extent of the GIFOV at the target background, the angular limits of the spectrometer imaging device's actual field of view may be derived and stored as the imaging device's actual field of view profile for later retrieval. By storing the actual field of view limits in angular form, the computer processor then needs only a target distance signal from the sensor probe's distance sensor when subsequently viewing a target in order to calculate and display the actual GIFOV of the spectrometer imaging device over the video image display.

Other objects, advantages and novel features of the present invention will become apparent from the following detailed description of the invention when considered in conjunction with the accompanying figures.

BRIEF DESCRIPTION OF THE DRAWINGS

FIG. 3 is a flow chart depicting a process for use of an embodiment of the present invention.

DETAILED DESCRIPTION OF THE DRAWINGS

Figure 1:
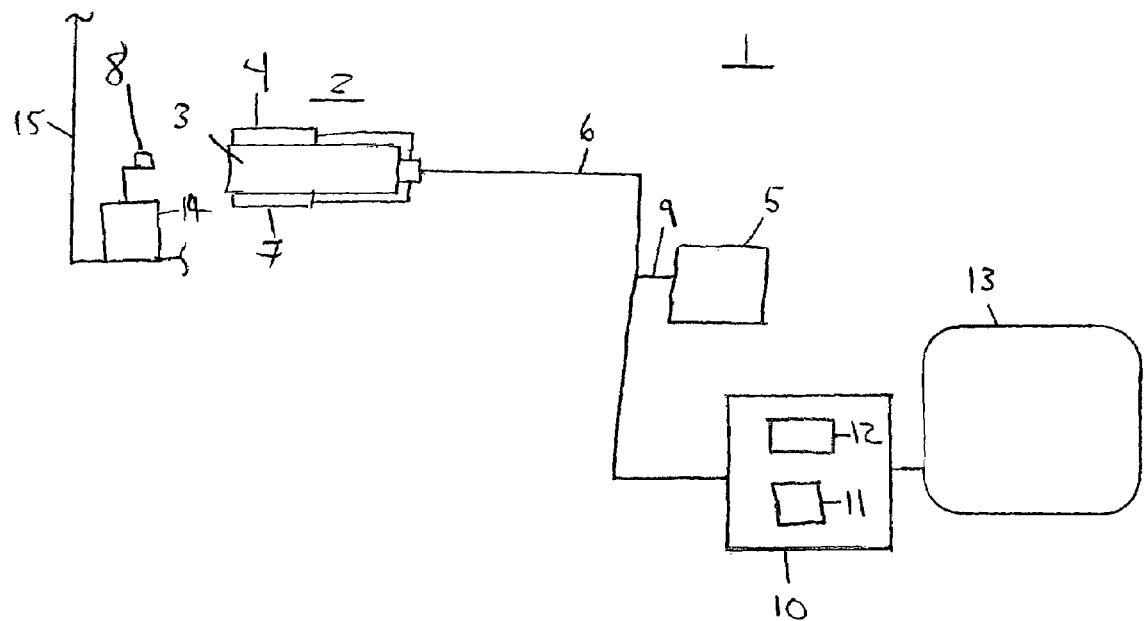
FIG. 1 is a schematic illustration of an embodiment of the present invention.

FIG. 1 illustrates schematically a spectroscopy system in accordance with an embodiment of the present invention. In the system 1, an integrated sensor probe 2 includes a video imaging device 3 (in this embodiment a conventional CCD video camera) which is equipped with an auto-focusing feature that automatically adjusts the camera focus as it is moved relative to a target.

Mounted on video device 3 is an image-viewing end of a spectrometer's fiber optic imaging device 4. The spectrometer imaging device 4 receives and passes spectral reflectance information obtained from a target to a spectrometer 5 via cable 6. The spectrometer imaging device 4 is mounted on the integrated sensor probe 2 in a manner which permits the fields of view of the video camera 3 and spectrometer imaging device 4 to overlap, and allows the imaging devices to be moved relative to one another during an initial device alignment operation.

Also mounted on the integrated sensor probe 2 is a distance sensor device 7, in this case a conventional ultrasonic sensor, which senses the distance between the fiber optic imaging device 4 and a target 8. The present invention is not limited to ultrasonic distance sensors, but rather other distance measuring systems, such as a radar range-finder. In this embodiment, target 8 is located on a stand 14, which is in front of a background 15. Alternatively, the target need not be mounted in a stand, but rather may be located in-situ within its natural environment, as long as it can be viewed within the field of view of the integrated sensor probe 2. Further, the probe 2 need not be located on a fixed mounting, but may be mounted on a mobile and/or remotely controlled platform, such as on the end of a remotely manipulable arm on a robotic vehicle.

For convenience in system set-up and operation, in this embodiment the signals generated by the video device 3, the spectrometer imaging device 4 and the distance sensor 7 are all carried on appropriate wires and/or fiber optic lines of a single conduit, cable 6. Alternatively, separate cables, or even wireless links, may be provided for the required data communications between the sensor devices. The spectrometer image signals branch off cable 6 via link 9 to reach spectrometer, and the output of the spectrometer is returned via link 9 to cable 6. Cable 6 ultimately conveys data generated by video camera 3, spectrometer 5 and distance sensor 7 to a computer 10 for further processing and display.

Computer 10 is a conventional personal computer, including a processor 11 and memory 12, and a display unit 13. Because the components and construction of a conventional desktop or laptop computer are well known, they will not be described in detail further herein. Memory 12 includes both random access memory (RAM), which contains data and program being processed by the computer at any given time, and storage memory (such as a hard drive and/or flash memory devices), which stores data received from the sensing devices of integrated sensor probe 2. Also stored in memory 12 are information describing the actual field of view of the spectrometer imaging device 4 and computer programs associated with the present invention's processing and display of spectral information.

In the present embodiment, the fiber optic imaging device 4 is formed with a Ocean Optics, Inc. (830 Douglas Ave., Dunedin, Fla. 34698) P600 fiber optic line, terminated with an Ocean Optics Gershun Tube Kit. The P600 optical fiber has a diameter of 600 microns and a maximum nominal field of view of 24.8 degrees. The Gershun tube kit provides the end of the fiber with a fixture which accepts user-interchangeable apertures. By changing the aperture size, the user can selectively narrow the field of view of the imaging device 4, and thereby tailor the field of view as needed for a specific spectrometry target. Spectrometer 5 is an Ocean Optics HR2000 model miniature fiber optic spectrometer, which may be remotely located away from the integrated sensor probe 2.

When a target does not completely fill the spectrometer imaging device's field of view, the computer processor 11 executes a program which corrects the reflectance information obtained from an image of the target by "subtracting" out the ground reflectance contributed by non-target (i.e., background) areas visible within the spectrometer's field of view. Programs which perform this function are known, such as described at p. 447 of *Remote Sensing: Models and Methods for Image Processing*, R. A. Schowengerdt, $2^{nd}$ Ed., Academic Press, San Diego, Calif. 92101. Accordingly, the details of such programs are not discussed further herein.

The calculations performed by processor 11 are based on the shape of the imaging device 4's field of view stored in memory 12. If the stored shape of the field of view is not an accurate representation of the actual field of view, the computer may inappropriately apply corrections in regions of an image where the theoretical and actual fields of view differ. In order to eliminate this potential source of error, an initial imaging device alignment and calibration procedure is performed before commencing imaging operations.

The alignment of the video imaging device and the spectrometer imaging device fields of view, as well as the simultaneous determination of the actual field of view of the spectrometer imaging device, is performed in a novel computer-based calibration process referred to as "virtual grid projection." The computer processor executes a calibration routine to project a virtual grid over a video image of a predetermined target surface, such as a dark-colored board on the display 13. The computer observes the response of the spectrometer imaging device to a contrasting target, such as a small white block, passed over the dark background in the area covered by each of the grid cells. The computer processor then executes a program sub-routine to convert the observed two-dimensional GIFOV at the target to a form suitable for subsequent recall. The resulting actual spectrometer response pattern may be stored in memory 12 as, for example, an angular field of view profile, or as a GIFOV at a reference distance.

Once the foregoing calibration process is completed, the spectrometry system of the present invention is ready for use. In the embodiment illustrated in FIG. 1, the integrated sensing probe 2 is placed before the target 8, and video and spectroscopy images are obtained from video camera 3 and spectrometer imaging device 4. The video image received from video camera 3 is processed by processor 11 and displayed on display 13. The image information obtained by imaging device 4 is conveyed to spectrometer 5, which in turn provides multiband spectral data to computer 10 for processing.

Figure 2:
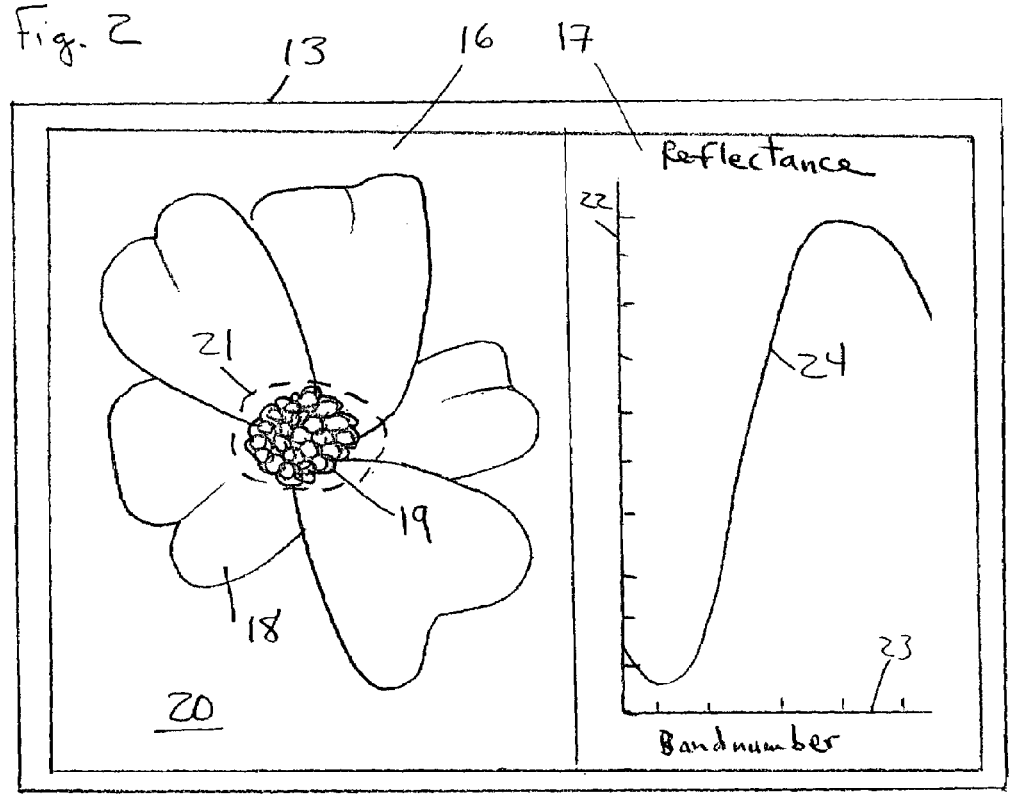
FIG. 2 is an example view of a display screen showing processes image data in accordance with an embodiment of the present invention.

FIG. 2 illustrates one approach to presenting the collected imaging information on display 13. In this embodiment, a Windows®-compatible spectrometry analysis program presents side-by-side windows 16, 17 on display 13. The video image obtained by video device 3 is presented in window 16, in this example a view of a flower with petals 18 and pistils 19. Also included in the image is background region 20. In order to enhance imaging accuracy, the video device 3 in this embodiment is equipped with an auto-focusing feature, the lens, sensor and software of which are well known in the video camera art and thus are not discussed further herein.

The processor 11 is further programmed to extract the previously obtained actual spectrometer field of view profile from memory 12 and, based on the distance to the target currently being sensed by distance sensing device 7, calculate and overlay a real-time outline 21 of the actual ground instantaneous field of view of the spectrometer over the video image in window 16. The spectrometer operator is thus provides a dynamically defined, on-screen indication of the precise location and lateral extent of the portion of a target region from which hyperspectral data is being acquired. Optionally, processor 11 may include overlaid references scales, such as width, height and/or angular and radial distance scales on the display.

If a target region of target 8 from which spectral information is desired fills the actual GIFOV of the spectrometer imaging device, the reflectance observed by the spectrometer imaging device will be uniform or "pure" reflectance. In the event uniform reflectance is observed, an image processing program included in the spectrometry system software recognizes the uniformity and permits spectral data acquisition to proceed.

If, on the other hand, the target region lies entirely within the imaging device's GIFOV, reflectance from background regions will be included within the sensed reflectance. Where such a non-uniform reflectance condition is identified, the image processing program provides a warning indication, such as a message presented on display 13, to warn the operator of possible spectral mixing of the target and background reflectance. If the operator desires to proceed with spectral data acquisition, a linear spectral de-mixing algorithm is executed on processor 11 to automatically extract pure target reflectance data from the observed reflectance. Programs which perform this function are also known, for example as described in the foregoing *Remote Sensing: Models and Methods* publication, and therefore the details of such programs are not discussed further herein.

A real-time representation of the spectral reflectance observed and processed by spectrometer imaging device 4, spectrometer 5 and computer processor 11 is presented in window 17, directly adjacent to window 16. In this window, the level of reflectance in each monitored spectral band is plotted on vertical scale 22 against the spectral band number on a horizontal scale 23. The resulting reflectance curve 24 presents the operator with immediate, real-time hyperspectral imaging information which is directly correlated to the adjacent visual image of the target and spectrometer field of view. The operator thus is provided with an immediate visual guide to permit adjustment of the orientation and distance of integrated sensor probe 2 relative to target 8 to scan a desired portion of the target or to track a moving target.

As the integrated sensor probe 2 and the target move relative to one another, the automated features of the present spectroscopy system adjust for this movement. For example, the video camera auto-focus feature ensures the video image remains clear, while the target range information provided by distance sensor 7 is used by processor 11 to alter the projection of the GIFOV of the spectrometer imaging device overlaid on display 13. In this way, the operator continues to be presented with a constantly-updated, real-time indication of the region being imaged by the spectrometer imaging device.

FIG. 3 illustrates a flow diagram of the logic underlying the present embodiment's operating programming. From a starting step 30, the processor 11 determines in step 31 whether the spectrometer imaging device's GIFOV has been determined, for example, by determining whether current field of view information is presently stored in memory 12. If the field of view of the spectrometer imaging device has not been determined, the GIFOV calibration sub-routine is executed in step 32, and then control is shifted back to step 31. If the GIFOV calibration has been previously conducted, the calibration information 34 is retrieved from memory. The processor next executes a target tracking step 34, using target recognition algorithms, and determines in step 35 whether a target has been located.

Once a target has been located, imaging data is obtained from the spectrometer field of view in step 36, and in step 37 the computer determines whether the current image is presenting pure reflectance, or whether instead mixed reflectance data is to be obtained. If the conditions indicate the presence of pure reflectance, the target is isolated and image and spectroscopic data are obtained and stored in steps 38 and 39, and the resulting data processed and presented on display 13 in step 40.

If, instead, data acquisition is to proceed with a mixed GIFOV, a mixed GIFOV subroutine is called. In this program, the reflectance from the background regions of the field of view are acquired in step 41, the mixed image and reflectance are obtained from the devices on integrated sensor probe 2 in step 42, and in step 43 the spectral de-mixing program is executed to extract the pure reflectance data from the desired target region from the mixed reflectance data. The subroutine then reverts to step 40, the processing and display of the obtained image and spectral data. Once the image and spectral data have been displayed, the system programming terminates at step 44. The routine may be repeated as many times as deemed necessary to obtain the desired reflectance information.

In a further embodiment, the pure or mixed reflectance target detection may be enhanced by use of a segmentation algorithm or an unsupervised classification algorithm. Such an algorithm is used to identify areas of reflectance uniformity within the GIFOV. With such processing, the system operator would be provided the ability to choose between viewing the raw image provided by imaging system on the on-screen display, or switching to view one or more segmented portions of the image identified by the algorithm, thereby permitting data acquisition and spectral analysis to be focused on desired portions of the imaging target.

It should be understood that the present invention is not limited to spectrometer imaging systems. The principles of the present invention are also Other embodiments include systems in which the spectrometer is replaced by other non-invasive sensors, such as a pyrometer, a gamma radiation sensor, a thermal-infrared thermometer, and a directional sound detector.

The foregoing disclosure has been set forth merely to illustrate the invention and is not intended to be limiting. Accordingly, since modifications of the disclosed embodiments incorporating the spirit and substance of the invention may occur to persons skilled in the art, the invention should be construed broadly to include everything within the scope of the appended claims and equivalents thereof.

What is claimed is:

1. A spectroscopy system for spectral imaging of a target, comprising:
    an integrated sensor probe, including
        a spectrometer imaging device,
        a video imaging device, and
        a distance sensor; and
    a computer including a processor and a display unit; wherein
        the video imaging device and the spectrometer imaging device are arranged on the integrated sensor probe such that their respective fields of view at least partially overlap,
        the distance sensor senses a distance corresponding to a target distance between the target and the spectrometer imaging device,
        the computer processor is programmed to process video image information received from the video imaging device, spectral image information received from the spectrometer imaging device, and target distance information received from the distance sensor, and to present on the display a video image comprising at least a portion of the video imaging device's field of view, and a graphic symbol overlaid thereon indicating the location and extent of a ground instantaneous field of view the spectrometer imaging device.

2. The spectroscopy system of claim 1, wherein
    the computer contains a storage memory, and
    the computer determines the position and extent of the ground instantaneous field of view to be overlaid on the display based on the sensed target distance and a predetermined actual spectrometer field of view profile stored in the computer memory.

3. The spectrometer system of claim 2, wherein
    the computer processor is programmed to present on the display, adjacent to the video image, spectrometry information obtained from a target region within the overlaid ground instantaneous field of view graphical symbol.

4. The spectrometer system of claim 1, wherein
    the spectrometer imaging device includes a spectrometer and an optical fiber.

5. The spectrometer system of claim 4, wherein
    the spectrometer is located remote from an imaging end of the optical fiber.

6. The spectrometer system of claim 1, wherein
    the integrated sensor probe is remotely located from the computer.

7. The spectrometer system of claim 6, wherein
    the integrated sensor probe linked via at least one of wires, optical fiber and wireless connections to the computer.

8. The spectrometer system of claim 7, wherein
    the integrated sensor probe is mounted on a remotely-controlled mobile platform.

9. A method for displaying spectroscopy information from a target, comprising the steps of:
    deploying an integrated sensor probe of a spectroscopy system before a target to be imaged, wherein the probe includes a spectrometer imaging device, a video imaging device, and a distance sensor;
    obtaining video image information from the video imaging device, spectral image information from the spectrometer imaging device, and distance information corresponding to target distance information between the target and the spectrometer imaging device from the distance sensor; and
    processing video image information, spectral image information and target distance information with a computer of the spectroscopy system; and
    displaying on a display unit of the spectroscopy system a video image comprising at least a portion of the video imaging device's field of view, and a graphic symbol overlaid thereon indicating the location and extent of a ground instantaneous field of view the spectrometer imaging device.

10. The method of claim 9, wherein the step of displaying includes
    recalling from a computer storage memory a predetermined actual spectrometer field of view profile, and
    determining the position and extent of the ground instantaneous field of view to be overlaid on the display based on the sensed target distance and the predetermined actual spectrometer field of view profile.

11. The method of claim 10, wherein the step of displaying includes
    presenting on the display, adjacent to the video image, spectrometry information obtained from a target region within the ground instantaneous field of view represented by the overlaid graphical symbol.

12. The method of claim 10, further comprising the step of:
    determining whether the obtained spectrometry information includes mixed reflectance information, wherein
    the processing step includes processing the obtained spectrometry information to extract pure reflectance information from any mixed reflectance information,
    the displaying step includes presenting on the display, adjacent to the video image, spectrometry information comprising pure reflectance information obtained from a target region within the ground instantaneous field of view represented by the overlaid graphical symbol.

13. The method of claim 10, further comprising the step of:
    obtaining the predetermined actual spectrometer field of view profile by
        presenting a calibration grid pattern graphic symbol on the display,
        passing a calibration target through at least a portion of the spectrometer imaging device field of view corresponding to a region covered by the calibration grid pattern, and processing and storing reflectance information obtained from the calibration target as it passed through the spectrometer imaging device field of view.

14. The method of claim 13, wherein the processed calibration reflectance information is stored in a form corresponding to an outline of a spectrometer field of view.

15. A non-invasive imaging system for imaging of a target, comprising:
a non-invasive imaging device,
a video imaging device, and a distance sensor; and
a computer including a processor and a display unit;
wherein
the video imaging device and the non-invasive imaging device are arranged on the integrated sensor probe such that their respective fields of view at least partially overlap,
the distance sensor senses a distance corresponding to a target distance between the target and the non-invasive imaging device, and
the computer processor is programmed to process video image information received from the video imaging device, information received from the non-invasive imaging device, and target distance information received from the distance sensor, and to present on the display a video image comprising at least a portion of the video imaging device's field of view, and a graphic symbol overlaid thereon indicating the location and extent of a ground instantaneous field of view of the non-invasive imaging device.

16. The non-invasive imaging system of claim 15, wherein
the computer contains a storage memory, and
the computer determines the position and extent of the ground instantaneous field of view to be overlaid on the display based on the sensed target distance and a predetermined actual non-invasive imaging device field of view profile stored in the computer memory.

17. The non-invasive imaging system of claim 15, wherein
the computer processor is programmed to present on the display, adjacent to the video image, information obtained from the non-invasive imaging device from a target region within the overlaid ground instantaneous field of view graphical symbol.

18. The non-invasive imaging system of claim 15, wherein the non-invasive imaging device is one of a pyrometer, a gamma radiation sensor, a thermal-infrared thermometer, and a directional sound detector.

* * * * *